United States Patent
Kang et al.

(10) Patent No.: US 10,432,375 B1
(45) Date of Patent: Oct. 1, 2019

(54) WIRELESS COMMUNICATION SYSTEM AND METHOD HAVING AUTOMATIC SELF-CONFIGURATION MECHANISM

(71) Applicant: WISTRON NEWEB CORPORATION, Hsinchu (TW)

(72) Inventors: Fu-Ming Kang, Hsinchu (TW); Ya-Ping Wei, Hsinchu (TW); Horen Chen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 0 days.

(21) Appl. No.: 16/006,608

(22) Filed: Jun. 12, 2018

(51) Int. Cl.
*H04L 5/00* (2006.01)
*H04B 17/345* (2015.01)
*H04W 72/08* (2009.01)
*H04W 72/04* (2009.01)

(52) U.S. Cl.
CPC ......... *H04L 5/0048* (2013.01); *H04B 17/345* (2015.01); *H04W 72/0486* (2013.01); *H04W 72/082* (2013.01)

(58) Field of Classification Search
CPC ... H04B 7/0626; H04B 7/0417; H04L 5/0048; H04L 5/0057
See application file for complete search history.

(56) References Cited

U.S. PATENT DOCUMENTS

2019/0200267 A1 * 6/2019 Meredith .............. H04W 36/22

* cited by examiner

*Primary Examiner* — Chandrahas B Patel
(74) *Attorney, Agent, or Firm* — Li & Cai Intellectual Property (USA) Office

(57) ABSTRACT

Wireless communication system and method having automatic self-configuration mechanism are provided. The method including configuring a first transceiver to perform a wireless network scan process to obtain a channel status report by executing a wireless network scan program, configuring the first transceiver to select one of the plurality of channels with the channel loading lower than a channel loading threshold, configuring the first transceiver to send a sounding signal to a second transceiver through the selected one of the plurality of channels, configuring the second transceiver to obtain channel status information (CSI) associated to the selected channel from the sounding signal; and configuring the second transceiver to determine whether a total data amount of the CSI is larger than a data amount threshold.

20 Claims, 7 Drawing Sheets

WIRELESS COMMUNICATION SYSTEM AND METHOD HAVING AUTOMATIC SELF-CONFIGURATION MECHANISM

BACKGROUND OF THE INVENTION

1. Field of the Invention

The present disclosure relates to a wireless communication system and method having automatic self-configuration mechanism, and particularly to a wireless communication system and method having automatic self-configuration mechanism.

2. Description of Related Art

In a various channel status information (CSI) required wireless communication technology, such as, machine learning, object detection, etc. Time-Reversal (TR) is also a kind of wireless signal technology which requires CSI. It mainly observes the distribution of the energy of the transmitting terminal in time and space. This physics phenomenon was first proposed by Zel'dovich and his team in 1985. Then in 1989, Fink and his team developed their application in signal processing. All of the above studies have focused on the frequency band of audio or ultrasound, and the TR techniques have recently been applied to Wi-Fi products.

When one transceiver (e.g., transceiver A) sends a signal to another transceiver (e.g., transceiver B), the transceiver B first sends a probe signal, like an impulse signal, to the transceiver A, the step is called the channel probing phase. Next, the transceiver A time-reversally processes the received signal and transmits it back to the transceiver B, this step is called TR transmission phase, and then the transceiver B analyzes the received signal (called channel impulse response, or CIR for short). Based on the characteristics of the channel and the effects of multipath in the environment, it has been experimentally shown that in an ideal environment, the CIR similarity at the same location can be as high as 0.98.

It can be known from the experimental results that the more data amount of CSI sent by the transceiver B is, the more data contained in the signal being reversed and transmitted back to the transceiver B by the transceiver A is, such that more discrepancies can be distinguished when the transceiver B analyzes the signal.

From the experimental results of TR, the transmission bandwidth and the number of transmittable antennas should be as large as possible for increasing the accuracy of results. However, the normal transmission will be inevitably affect by the large number of antennas being used for TR transmission, resulting in decreases in throughput, and even worse, other wireless devices in the surrounding areas will be also interfered. Thus, how to obtain sufficient CSI without affecting the current wireless transmission is a task to be resolved.

SUMMARY OF THE INVENTION

According to an embodiment of the present disclosure, there is provided a wireless communication method having automatic self-configuration mechanism, including: configuring a first transceiver to perform a wireless network scan process to obtain a channel status report by executing a wireless network scan program, wherein the channel status report includes channel loadings of a plurality of channels; configuring the first transceiver to select one of the plurality of channels with the channel loading lower than a channel loading threshold; configuring the first transceiver to send a sounding signal to a second transceiver through the selected one of the plurality of channels; configuring the second transceiver to receive the sounding signal; configuring the second transceiver to obtain channel status information (CSI) from the sounding signal; and configuring the second transceiver to determine whether a total data amount of the CSI is larger than a data amount threshold.

According to another embodiment of the present disclosure, there is provided a wireless communication system having automatic self-configuration mechanism, including a first transceiver and a second transceiver. The first transceiver is configured to perform a wireless network scan process to obtain a channel status by executing a wireless network scan program, and the channel status includes channel loadings of a plurality of channels. The second transceiver wirelessly communicated with the first transceiver, the first transceiver is configured to select one of the plurality of channels with the channel loading lower than a channel loading threshold. The first transceiver is configured to send a sounding signal to a second transceiver through the selected one of the plurality of channels. The second transceiver is configured to receive the sounding signal, and to obtain channel status information (CSI) from the sounding signal. The second transceiver is configured to determine whether a total data amount of the CSI is larger than a data amount threshold.

According to yet another embodiment of the present disclosure, there is provided a wireless communication method having automatic self-configuration mechanism, including: configuring a wireless self-organizing network (SON) central controller wirelessly communicated with a first wireless SON extender to establish a wireless network system; configuring a second wireless SON extender to join the wireless network system by performing an automatic self-configuration process, wherein the automatic self-configuration process includes: configuring the wireless SON central controller to perform a wireless network scan process to obtain a channel status report by executing a wireless network scan program, and the channel status report includes channel loadings of a plurality of channels; configuring the wireless SON central controller to select one of the plurality of channels with the channel loading lower than a channel loading threshold; and establishing a first connection between the SON central controller and the second extender through the selected one of the plurality of channels.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the disclosure are set forth in the appended claims. The disclosure itself, however, as well as modes of use, further objectives and advantages thereof, will best be understood with reference to the following detailed description of exemplary embodiments of the present disclosure when read in conjunction with the accompanying drawings, wherein:

DETAILED DESCRIPTION OF THE PREFERRED EMBODIMENTS

Figure 1A:
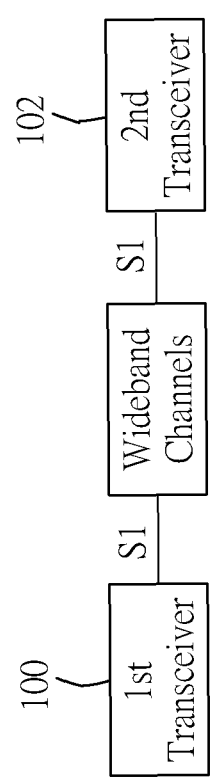
FIG. 1A shows a diagram of a wireless communication system having automatic self-configuration mechanism depicted in accordance with an exemplary embodiment.
Figure 1B:
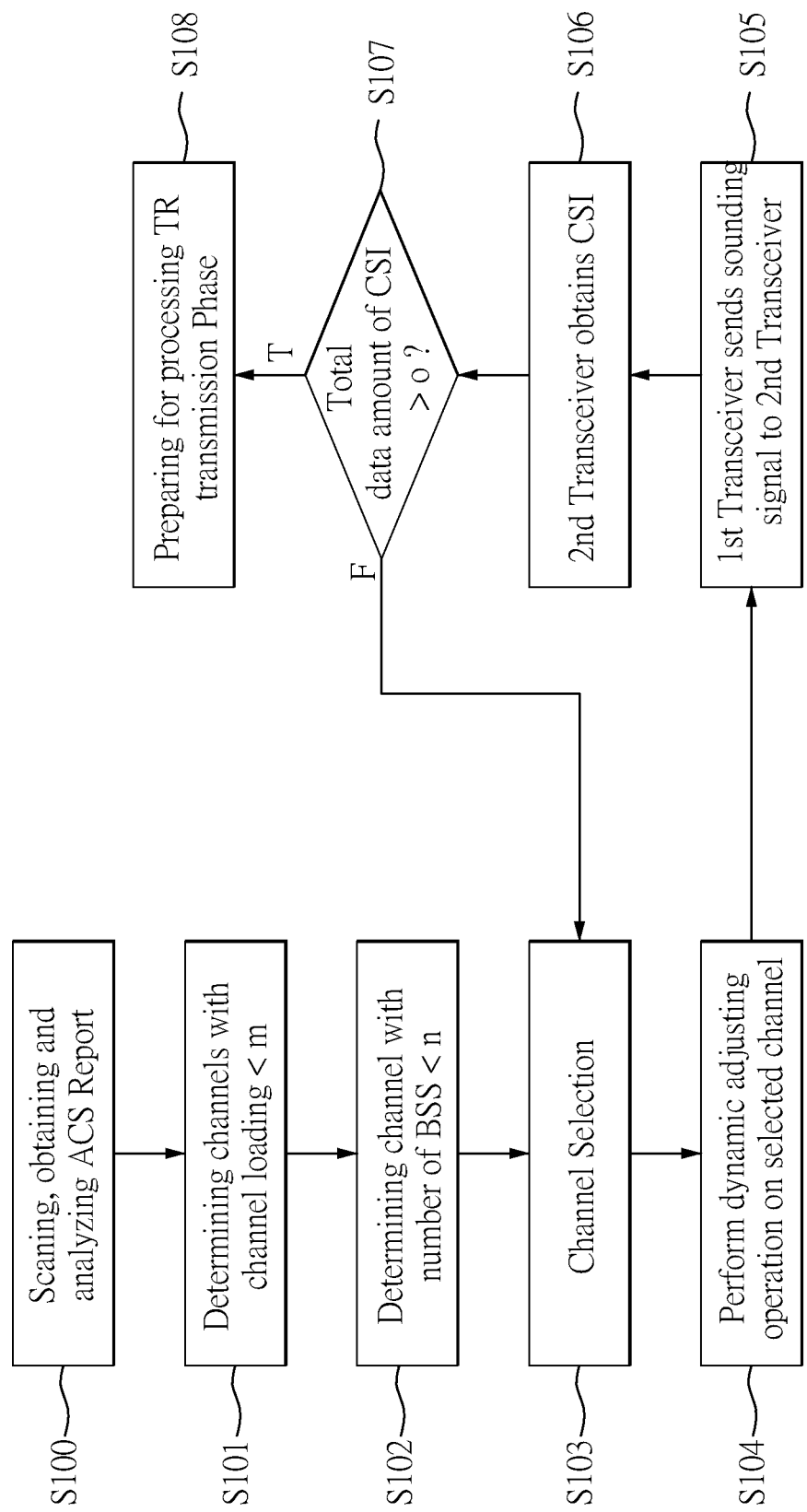
FIG. 1B shows a flow chart of a wireless communication system having automatic self-configuration mechanism depicted in accordance with an exemplary embodiment.

Referring more particularly to the drawings, embodiments of the disclosure may be described in the context of the wireless communication system having automatic self-configuration mechanism as shown in FIGS. 1A and 1B.

As shown in FIGS. 1A and 1B, a diagram of a wireless communication system having automatic self-configuration mechanism is depicted in accordance with an exemplary embodiment of the present disclosure, and a flow chart of a wireless communication system having automatic self-configuration mechanism is depicted in accordance with an exemplary embodiment. The wireless communication system 1 may be implemented in any type of computing device. In this embodiment, the wireless communication system 1 may include a first transceiver 100 and a second transceiver 102.

In this embodiment, the first transceiver 100 may be a WiFi access points (AP), and includes a smart antenna, sends a wireless signal that propagates through a wireless channel and arrives at the second transceiver 102 as a multipath wireless signal. The smart antenna may be implemented in this embodiment and the smart antenna has antenna array supporting directional or omnidirectional radiation patterns. Furthermore, the first transceiver 100 may also include radio frequency (RF) circuit(s), intermediate frequency (IF) circuit(s) and baseband circuit(s). It should be noted that the second transceiver 102 has the same structure with the first transceiver 100.

In some embodiments, the frequency range of the transmission signal may be between 30 GHz and 300 GHz. The antenna controlling circuit can be configured to adjust the first transceiver 11 to be comply with the IEEE 802.11 standard. The IEEE 802.11 standard can include at least one of IEEE 802.11a, IEEE 802.11b, IEEE 802.11g, IEEE 802.11n, IEEE 802.11ac, or IEEE 802.11ad standards. Preferrably, the first transceiver 11 may be comply with 802.11ad (60 GHz Wi-Fi).

In certain wireless communication applications, the TR wireless transmission may be provided for accurately predicting the position, detecting events and recognizing gestures. In order to allow the TR Wireless transmission to be coexisted with the wireless communication system while obtaining excellent communication quality, an automatic self-configuration mechanism is provided in the wireless communication system and method of the present disclosure.

In the automatic self-configuration mechanism, the first transceiver 100 may be configured to perform a wireless network scan process to obtain a channel status by executing a wireless network scan program, as provided in step S100. For example, the wireless network scan program may be WiFi tool provided in Software Development Kit (SDK) provided by companies in the present field, such as Qualcomm SDK, which also includes numbers of softwares such as Wlanconfig, iwconfig, iwinfo, etc., these tools may be executed by the first transceiver 100 to configure, debug, data analysis, etc. for WiFi communication. Furthermore, the channel status may be a specific report called ACS report, the ACS report lists all supported channels in the frequency band (eg, 2.4 GHz or 5 GHz), and provides channel frequencies, channel numbers, number of basic service set (BSS), noise floor (NF), and channel loadings for each channel, the channels with light loadings may be determined by analyzing the channel status. The number of the BSS represents a level of interference in the surrending. A basic WLAN environment contains 2 BSS, for example, includes one access point and one client device (both may be referred as one station). If only one access point is provided without any client device connected thereto, no interference for data transmission will be generated, and therefore the number of BSS in the network would include at least two stations.

As mentioned, the channel status may include channel loadings of a plurality of channels, and after the second transceiver 102 wirelessly communicates with the first transceiver 100, the first transceiver 100 may be configured to select one of the plurality of channels with the channel loading lower than a channel loading threshold m, as depicted in step S101.

Furthermore, interferences in the communication region increases as the number of BSS. Therefore, for determining which of the channels has light loading, the first transceiver 100 may be further configured to determine which of the channels having the number of BSS lower than a BSS threshold n by analyzing the channel status, as depicted in step S102. Afterward, the first transceiver 100 may be configured to select one of the channels with the channel loading lower than the channel loading threshold m and with the number of BSS lower than the BSS threshold n, as depicted in step S103.

Moreover, other parameters may be listed in the ACS reports for assisting the selection for the channels. For example, software such as ACS check interference may be executed to determine whether the interferences of RADAR channels, static turbo channels or Dynamic Frequency Selection (DFS) channel exist in the channels listed in the ACS reports.

According to the status of the wireless network provided by the ACS Report, a channel would be selected for transmitting CSI by the first transceiver 100 without affecting the current transmission of the wireless network. The detailed descriptions would be described as below.

In more detail, prior to starting the channel probing phase for TR transmission, the automatic self-configuration mechanism will perform a scan process to detect the status of the current wireless communication environment (i.e., Channel Status Information detection) and decide which aspect of the wireless communication need to be dynamically adjusted. The dynamic adjustment procedure enables the TR transmission to perform smoothly, and to accurately predict while ensuring the quality of wireless communications. For example, the bandwidth with 802.11 2.4 GHz is planned to be operated with 14 channels, which are divided into overlapping channels and non-Overlapping channels. Before the channel probing phase for the TR transmission, a channel scan step is performed to scan each channel to obtain the channel status of each channel, in which the data rate, Modulation and Coding Scheme (MCS) or any other information of the channels can be utilized to determine the quality of the channel communication. From this information, the channels currently communicating in the wireless communication environment or idling may be listed, and the channel is then appropriately selected based on the protocol of the connected network, and the frequency band, number of channels defined according to the protocol, and bandwidth of each channel.

Afterward, dynamic adjusting operations such as dynamic frequency hopping operations, dynamically adjusting operations for the transmit power, and the transmission strength attenuating or enhancing operations may be performed on the selected channel, as depicted in step S104.

In the present embodiment, the first transceiver 100 is configured to send a sounding signal S1 to a second transceiver through the selected one of the plurality of channels, and the second transceiver 200 is configured to receive the sounding signal S1, as depicted in step S105, and to obtain channel status information (CSI) from the sounding signal, as depicted in step S106.

Specifically, the CSI Tool included in Software Development Kit (SDK) may be executed, in which the first transceiver 100 uses the selected channel to send the sounding signal S1 to the second transceiver 102. The second transceiver 102 (e.g., served as a client) receives the data and obtains the CSI. The CSI may include a spatial matrix caused by the sounding signal transmitted from the first transceiver 100, including amplitude and phase that may represent spatial characteristics.

Furthermore, prior to the TR transmission, each channel may be scanned through single, multiple, continuous, or interval modes, send packets, sample, detect whether the packet is in collision, or is successfully transmitted. This avoids interference with normal wireless communications to affect overall network performance, and the accuracy of the TR transmission may be enhanced by segmenting multiple scans.

In this case, the CSI contains the information of the selected channel in the space. The size of the CSI may be a product of (number of Rx antennas)*(number of Tx antenna) *(number of subcarriers), where the number of Rx antennas and the number of Tx antenna represents the numbers of antennas at receiving terminal and transmitting terminal, respectively. The number of subcarriers is determined based on the subcarriers transmitted through the channel with the bandwidth of 20 MHz or with the bandwidth of 40 MHz. For example, the number of subcarriers transmitted through the channel with the bandwidth 20 MHz may be 56, 30, and 16.

Furthermore, the CSI tool may be executed to analyze the CSI to obtain the bandwidth, the data rate of received packet, number of receiving antennas, number of transmitting antennas, number of subcarriers, phy error code and RSSI of the channel. For example, the packets is transmitted when the channel is set to be operated with bandwidth of 2.437 GHz), the number of RX antennas is set to 3, the number of TX antenna is set to 1, and the bandwidth is set to 20 MHz. The value of phyerr equals to 0 indicates that the packet is successfully received, and obtained the CSI data matrix thereof is 3×1×56, which means there are three sets CSI data associated to 56 subcarriers and data rate is 133.

Next, the second transceiver 102 is configured to determine whether a total data amount of the CSI is larger than a data amount threshold o, as depicted in step S107, if the total data amount of the CSI is larger than the data amount threshold o, for example, the data amount threshold o may be 100 sets CSI data associated to the subcarriers, the method proceeds to step S108, the first transceiver 100 and the second transceiver 102 is configured to prepare for processing the TR transmission phase. Please note that it is not limited to processing the TR transmission phase in S108, and any functions needs CSI may be performed in S108. If the total data amount of the CSI is smaller than the data amount threshold o, the method proceeds back to step S103, the first transceiver 100 is configured to select another one of the channels with the channel loading lower than the channel loading threshold m and with the number of BSS lower than the BSS threshold n.

In the architecture, the present disclosure provides a wireless communication system and method having automatic self-configuration mechanism allowing the data transmission associated with CSI to be operated in co-existence with wireless communication systems and achieving excellent communication quality. The data transmission, such as the TR wireless transmission, may be provided for accurately predicting the position, detecting events and recognizing gestures.

Figure 2:
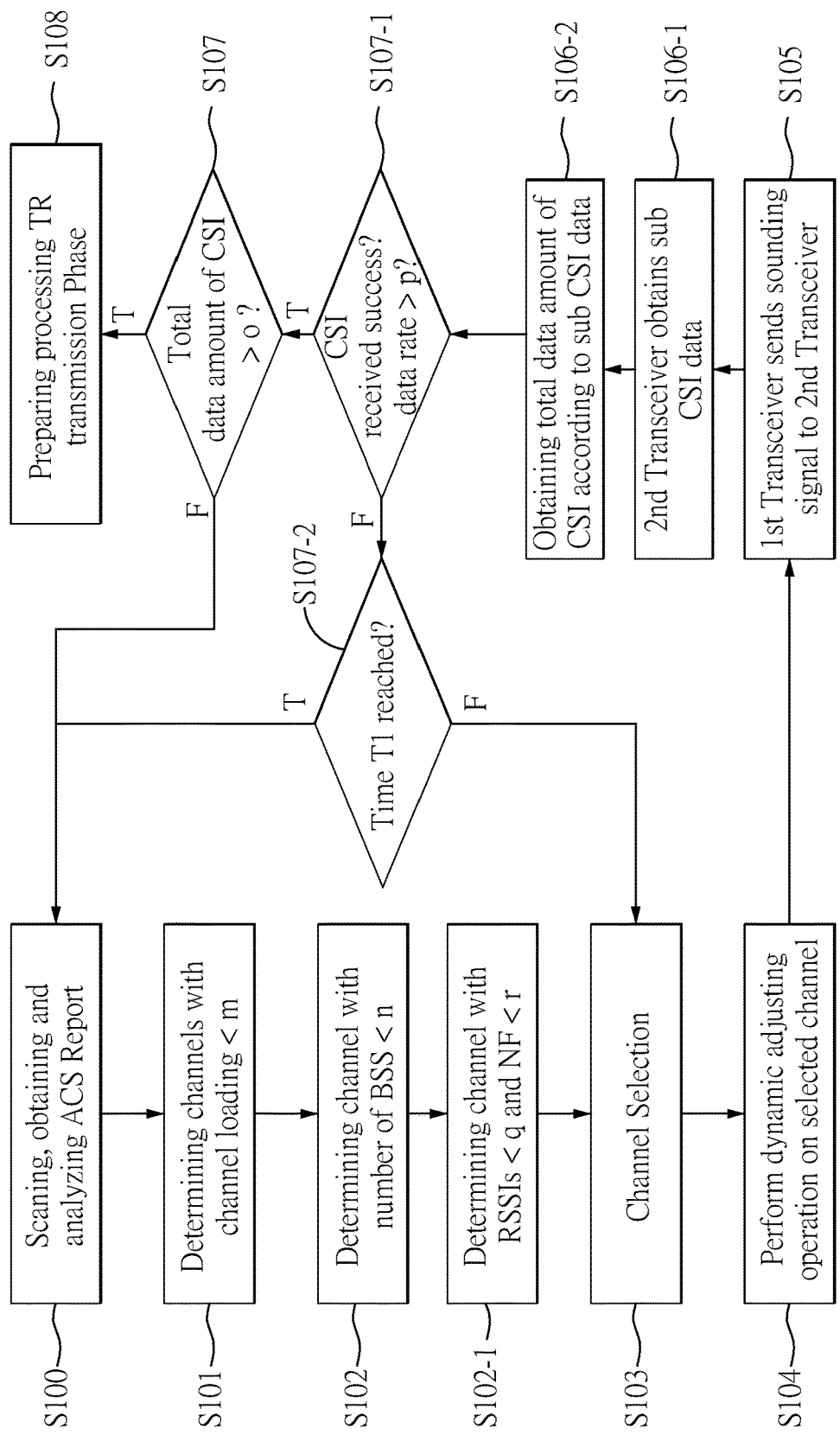
FIG. 2 shows a flow chart of a wireless communication system having automatic self-configuration mechanism depicted in accordance with another exemplary embodiment.

Reference is now made to FIG. 2, which shows a flow chart of a wireless communication system having automatic self-configuration mechanism depicted in accordance with another exemplary embodiment.

In the present embodiment, the wireless communication method having the automatic self-configuration mechanism is described in more detailed while making reference to the accompany figure, and is also applicable to the wireless communication system 1 provided in the previous embodiment, and thus the repeated description is omitted.

Similarly, in the automatic self-configuration mechanism, the first transceiver 100 may be configured to perform a wireless network scan process to obtain a channel status by executing a wireless network scan program, as provided in step S100.

After the second transceiver 102 wirelessly communicates with the first transceiver 100, the first transceiver 100 may be configured to select one of the plurality of channels with the channel loading lower than a channel loading threshold m, as depicted in step S101.

The first transceiver 100 may the be further configured to determine which of the channels having the number of BSS lower than a BSS threshold n by analyzing the channel status, as depicted in step S102.

As mentioned above, other parameters may be listed in the ACS report for assisting the selection for the channels, and specifically, the ACS report may further includes received signal strength indications (RSSIs) and noise floors (NFs) of the channels. In step S102-1 the first transceiver is configured to select one of the plurality of channels with the RSSIs higher than a RSSI threshold q and the noise floors lower than a noise floor threshold r, such that the interference and the signal strength may be taken into consideration while determining the channel with light loadings. At least one of steps S101, S102, S102-1 may be utilized for determining the channel with light loadings.

The first transceiver 100 may then be configured to select one of the channels with the channel loading lower than the channel loading threshold m and with the number of BSS lower than the BSS threshold n, as depicted in step S103.

Similarly, the dynamic adjusting operations such as dynamic frequency hopping operations, dynamically adjusting operations for the transmit power, and the transmission strength attenuating or enhancing operations may be performed on the selected channel, as depicted in step S104.

The first transceiver 100 is configured to send a sounding signal S1 to a second transceiver through the selected one of the plurality of channels, and the second transceiver 200 is configured to receive the sounding signal S1, as depicted in step S105.

Specifically, the total data amount mentioned in the previous embodiment may represent a number of the plurality of sub CSI data obtained from the sounding signal S1, as depicted in step S106-1.

Furthermore, the total data amount of CSI may be according to a number a plurality of sub CSI data, as depicted in step S106-2. Specifically, the number of sub CSI data may be calculated to obtain the total data amount of CSI. For example, a first sub CSI data is 3×1×56 and a second sub CSI data is 3×3×56. The total data amount of CSI is 12. As mentioned previously, 56 may be the number of subcarriers.

Afterward, the CSI tool may be executed to analyze the CSI to obtain the bandwidth, the data rate of received packet, number of receiving antennas, number of transmitting antennas, number of subcarriers, phy error code and RSSI of the channel. The method further proceeds to step S107-1, the second transceiver 102 is configured to determine whether the packets are received successfully according to phy error code, and to determine whether the data rate of received packet is larger than a data rate threshold p. The use of the threshold p is for checking whether the data rate of the received CSI packet is larger than p. The data rate of the received packet would lack of credibility if it is lower than the threshold value.

If the packets are not received successfully, or the data rate of received packet is smaller than a data rate threshold p, the method proceeds to step S107-2, configuring the second transceiver 102 to determine whether a total operation time reaches a preset time T1. The preset time T1 is designed for ensuring that the environment of the wireless communication has not been changed significantly. If the total operation time does not reach the preset time T1, the method may proceed back to step S103, selecting another channel that meet the requirements defined in steps S101 to S103. If the total operation time reaches the preset time T1, the method proceeds back to step S100, re-performing the wireless network scan process to obtain a channel status by executing the wireless network scan program.

If the data rate of received packet is larger than a data rate threshold p, and the packets are successfully received, the method proceeds to step S107, configuring the second transceiver 102 to determine whether a total data amount of the CSI is larger than a data amount threshold o. As mentioned above, the total data amount represents a number of the plurality of sub CSI data obtained from the sounding signal. If the total data amount of the CSI is smaller than the data amount threshold o, the method proceeds to step 100, the first transceiver is configured to perform another wireless network scan process to obtain another channel status report by executing the wireless network scan program. If the total data amount of the CSI is larger than the data amount threshold o, the method proceeds to step S108, the first transceiver 100 and the second transceiver 102 is configured to prepare for processing the TR transmission phase.

In this case, the interference and the signal strength may be taken into consideration while determining the channel with light loadings, and therefore, the present disclosure provides a wireless communication system and method having automatic self-configuration mechanism allowing the data transmission associated with CSI to be operated in co-existence with wireless communication systems and achieving excellent communication quality. The data transmission, such as the TR wireless transmission, may be provided for accurately predicting the position, detecting events and recognizing gestures.

Figure 3:
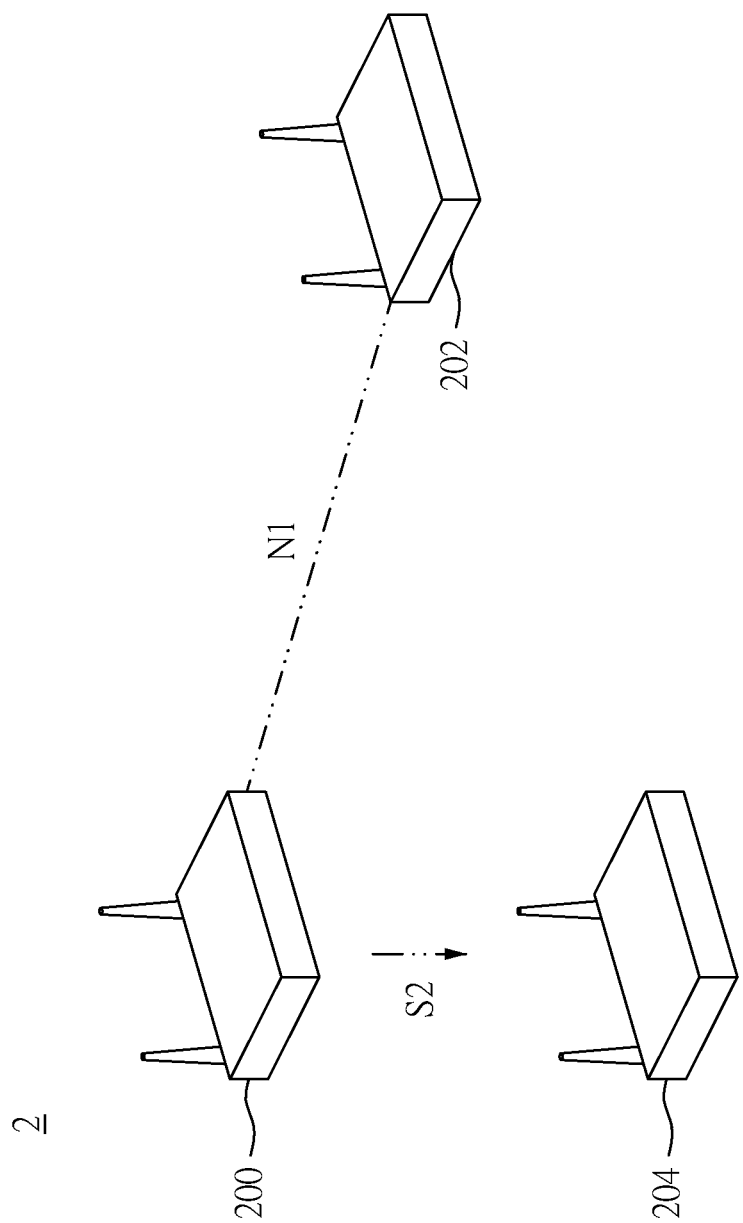
FIG. 3 shows a diagram of a wireless communication system having automatic self-configuration mechanism depicted in accordance with yet another exemplary embodiment.
Figure 4:
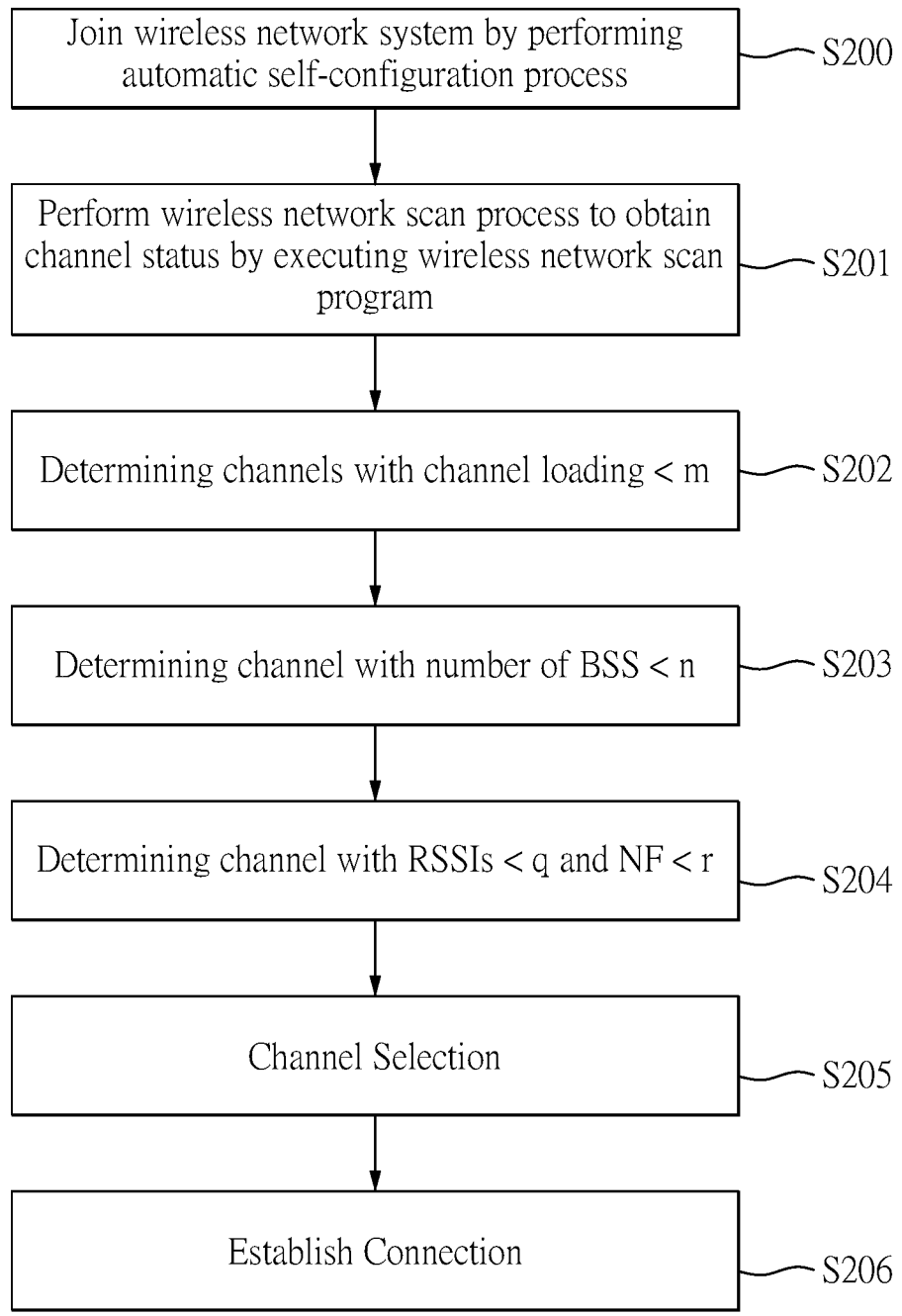
FIG. 4 shows a flow chart of a wireless communication system having automatic self-configuration mechanism depicted in accordance with yet another exemplary embodiment.

Reference is now made to FIGS. 3 and 4. FIG. 3 shows a diagram of a wireless communication system having automatic self-configuration mechanism depicted in accordance with yet another exemplary embodiment, and FIG. 4 shows a flow chart of a wireless communication system having automatic self-configuration mechanism depicted in accordance with yet another exemplary embodiment.

As shown in FIGS. 3 and 4, a wireless communication system 2 and method having automatic self-configuration mechanism are provided. In this case, a Wi-Fi self-organizing network (SON) central controller 200 forms a network system N1 with a first WiFi SON extender 202. For adding the second WiFi SON extender 204 to the network system N1, the following procedures are utilized:

Step S200, configuring the second wireless SON extender 204 to join the wireless network system N1 by performing an automatic self-configuration process, wherein the automatic self-configuration process comprises:

Step S201, configuring the wireless SON central controller 200 to perform a wireless network scan process to obtain a channel status by executing a wireless network scan program, and the channel status report includes channel loadings of a plurality of channels. Similarly, the wireless SON central controller 200 may be further configured to determine which of the channels having the number of BSS lower than a BSS threshold by analyzing the channel status, and other parameters, such as noise floor (NF) may be listed in the ACS reports for assisting the selection for the channels. For example, software such as ACS check interference may be executed to determine whether the interferences of RADAR channels, static turbo channels or Dynamic Frequency Selection (DFS) channel exist in the channels listed in the ACS reports.

Step S202, configuring the wireless SON central controller 200 to to determine which of the plurality of channels with the channel loading lower than a channel loading threshold m. Other parameters may be considered while selecting the channel with loading lower than the channel loading threshold, such as number of BSS, RSSI and noise floor, will be discussed hereinafter.

Step S203, configuring the wireless SON central controller 200 to determine which of the channels having the number of BSS lower than a BSS threshold n by analyzing the channel status.

Step S204, configuring the wireless SON central controller 200 to determine which of the plurality of channels with the RSSIs higher than a RSSI threshold q and the noise floors lower than a noise floor threshold r.

Step S205, configuring the wireless SON central controller 200 to select one of the plurality of channels with the the channel loading lower than a channel loading threshold m, the number of BSS basestations lower than a BSS threshold n, the RSSIs higher than a RSSI threshold q and the noise floors lower than a noise floor threshold r.

Step S206, configuring the wireless SON central controller 200 to established the wireless communication between the wireless SON central controller 200 and the second wireless SON extender 204 through the selected one of the plurality of the channels. That is, the second wireless SON extender 204 is successfully joined to the wireless network system N1. After the wireless communication is established, the dynamic adjusting operation may be performed on the channel as depicted in the previous embodiments, and the data transmission associated with the CSI, such as the TR transmission, may be prepared to be processed therebetween.

Figure 5:
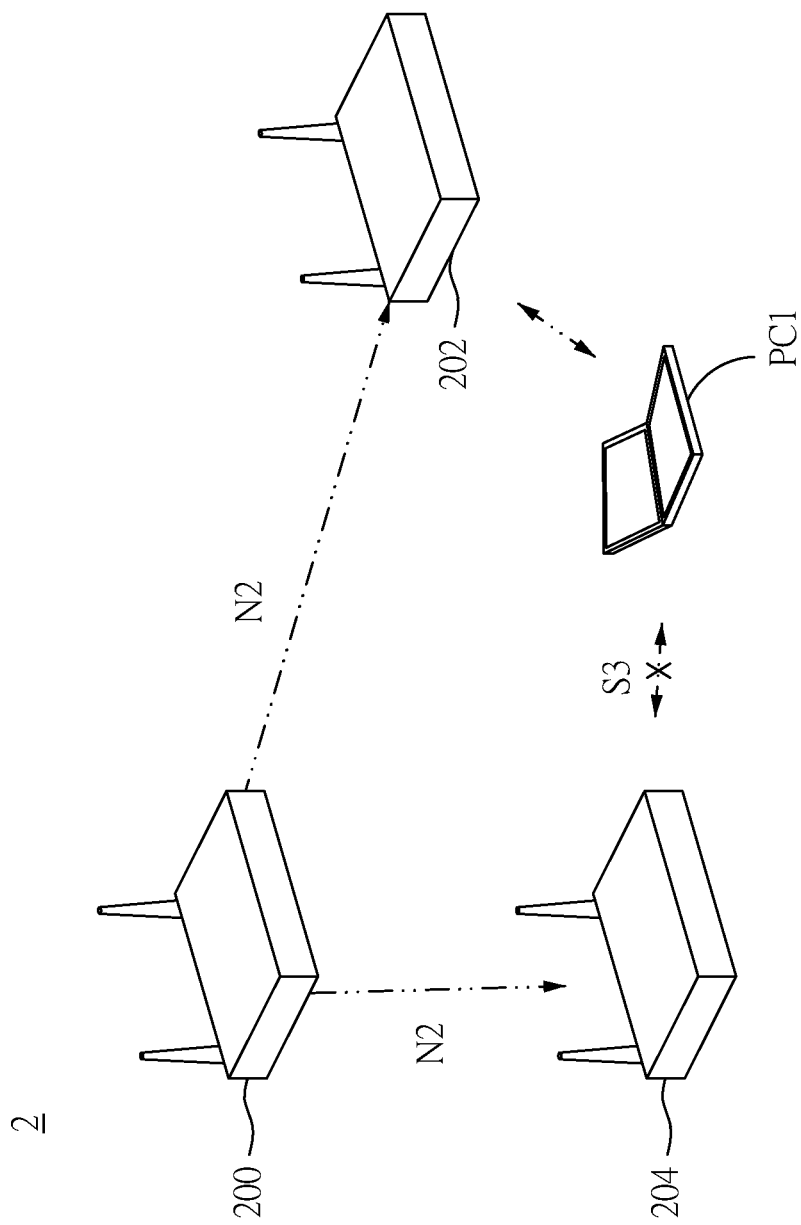
FIG. 5 shows another diagram of a wireless communication system having automatic self-configuration mechanism depicted in accordance with yet another exemplary embodiment.
Figure 6:
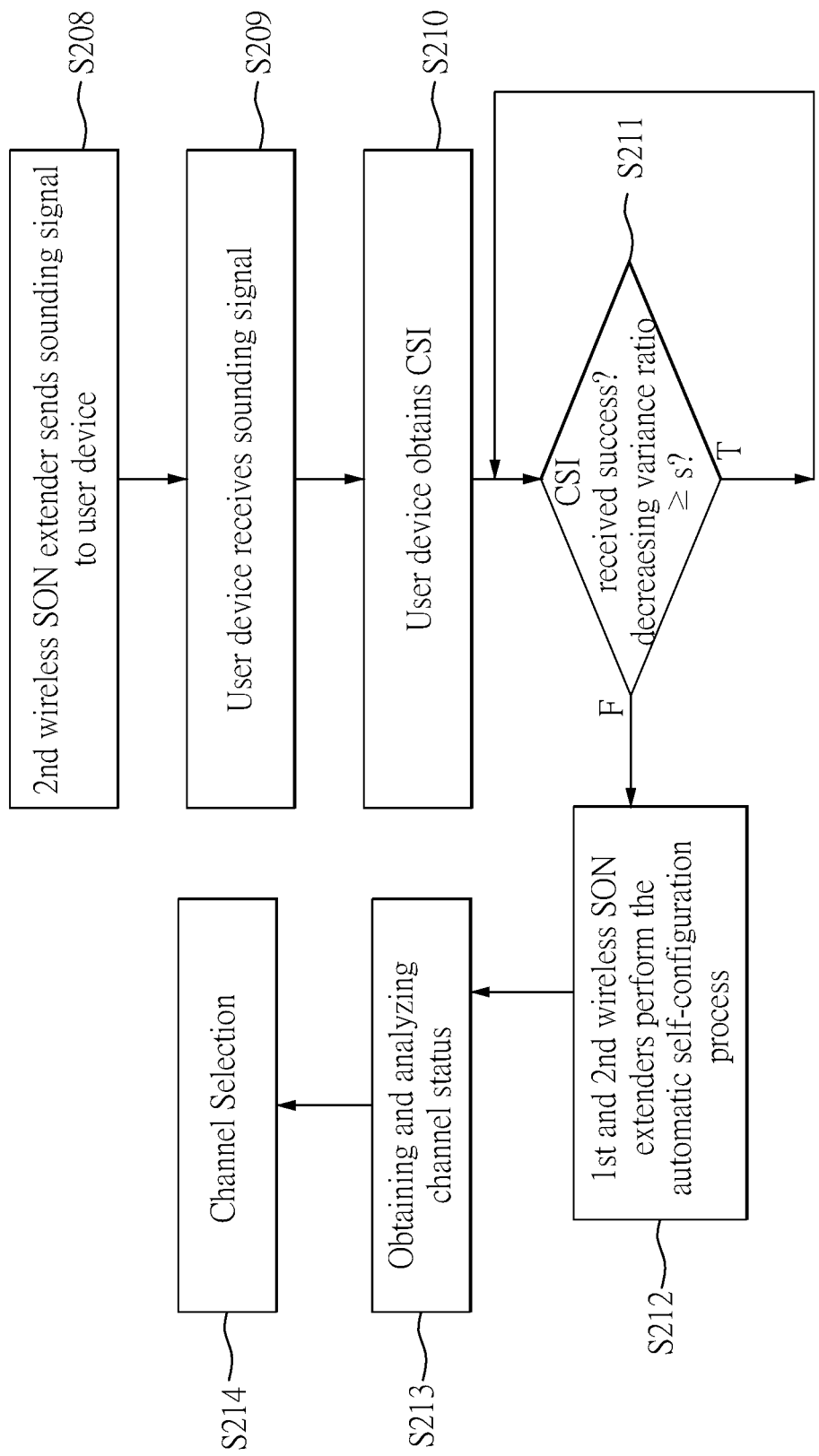
FIG. 6 shows another flow chart of a wireless communication system having automatic self-configuration mechanism depicted in accordance with yet another exemplary embodiment.

Reference is now made to FIGS. 5 and 6. FIG. 5 shows another diagram of a wireless communication system having automatic self-configuration mechanism depicted in accordance with yet another exemplary embodiment, and FIG. 6 shows another flow chart of a wireless communication system having automatic self-configuration mechanism depicted in accordance with yet another exemplary embodiment.

As shown in FIGS. 5 and 6, a wireless communication system 2' and method having automatic self-configuration mechanism are provided.

As shown in the figures, the WiFi SON Central Controller 200 forms a network system N2 with the first and second WiFi SON Extender 202 and 204, and a user device PC1 connects to the Wi-Fi SON Extender 204.

Specifically, the user device PC1 is configured to join the wireless network system by communicating with the second wireless SON extender 204 through a first channel of the plurality of channels.

Since the user device PC1 have already been connected to the Wi-Fi SON Extender 204, the automatic self-configuration process is performing between the second wireless SON extender 204 and the user device PC1.

If the wireless communication between PC1 and Wi-Fi SON Extender B is interfered at this time, the second wireless SON extender 204 and the user device PC1 are configured to perform the automatic self-configuration process, which includes:

Step 208, configuring the second wireless SON extender 204 to send a sounding signal S3 to the user device through the first channel;

Step 209, configuring the user device PC1 to receive the sounding signal;

Step 210, configuring the user device PC1 to obtain CSI from the sounding signal Step 211, configuring the user device PC1 to determine whether the packets are received successfully according to phy error code, and to determine whether a decreasing variance ratio of the data rate of received packet is larger than a variance ratio threshold s. It is noted that the larger of decreasing variance raio means data rate is becoming worse.

If the packets are not received successfully, or the decreasing variance ratio of the data rate of received packets is greater than a variance ratio threshold s, the method proceeds to step S212, the SON central controller 200 is configured to control the first wireless SON extender 202 to perform the automatic self-configuration process between the first wireless SON extender 202 and the user device PC1, and to control the second wireless SON extender 204 to perform the automatic self-configuration process between the second wireless SON extender 204 and the user device PC1 and to respectively obtain a first channel status and a second channel status. The variance ratio of the data rate utilized here rather than the data rate is for determining the quality of the wireless communication therebetween, since the data rate may be extremely low in certain environment for the second wireless SON extender 204 and the user device PC1. On the other hand, if the packets are received successfully and the decreasing variance ratio of the data rate of received packets is smaller that the variance ratio threshold q, the user device PC1 may maintain the current connection with the Wi-Fi SON Extender 204

In some embodiments, the wireless communication between the user device PC1 and second wireless SON extender 204 may be interfered at this time, the packets would not be received successfully, or the decreasing variance ratio of the data rate of received packets would be greater than the variance ratio threshold s, thus the automatic self-configuration process is then performed accordingly to obtain the first and second channel status.

Afterward, the automatic self-configuration process may further proceed to step S213, obtaining and analyzing the channel status. In detail, the first wireless SON extender 202 and the second wireless SON extender 204 is configured to respectively send the first channel status and the second channel status to the SON central controller 200, and proceeds to step S214, selecting one channel with the loading lower than the channel loading threshold, and other parameters, such as the number of BSS, noise floors (NFs), and channel loadings for each channel may be considered as mentioned above.

However, if the data rate of received packet is larger than a data rate threshold p, and the packets are successfully received, the method proceeds back to step S211, configuring the user device PC1 to continuously determine whether the packets are received successfully according to phy error code, and to determine whether the decreasing variance ratio of the data rate of received packet is greater than the variance ratio thresholds.

After the automatic self-configuration process is performed, if the SON central controller 200 determines that the wireless communication between the user device PC1 and the first wireless SON extender 202 would have better performance, the user device PC1 will be connected to the first wireless SON extender 202 according to the selection made by the SON central controller 200, as depicted in step S214.

However, if the SON central controller 200 determines that the wireless communication between the user device PC1 and the second wireless SON extender 204 still has the best performance among the plurality of channels, the channel would not be changed.

In the present embodiment, the automatic self-configuration mechanism is integrated with the wireless communication system with the WiFi SON to achieve complementary effects. WiFi SON is mainly for simplifying network deployment problems in homes and offices, optimizing overall network performance, and providing users with the best network environment. By utilizing the automatic self-configuration mechanism provided in the present disclosure, the following advantages may be achieved:

Self Configuring: When a new wireless device is connected, the SSID, channel, power, and other parameters of the wireless device can be set by the system. The user does not need to make any settings to achieve a plug-and-play network architecture.

Self Managing: The system will adjust the bandwidths, priorities and other parameters of all wireless devices, such that the wireless devices would not interfere with each other while improving the overall network performance.

Self Healing: When there is a wireless device failure, the system will reconfigure the new transmission path to maintain the connection quality of the user device.

Therefore, when the Wi-Fi SON is performing self-configured functions, the automatic self-configuration mechanism algorithm may be utilized to optimize the newly added wireless devices and store the result in the Wi-Fi SON controller equipment. Next, any changes of the environment will be recorded by the wireless device at any time. If a nearby access point in the system fails, or signals from other wireless communication system interferences occurs, the Wi-Fi SON central control device will be informed to make adjustments in response to the overall system performance.

The description of the different exemplary embodiments has been presented for purposes of illustration and description, and is not intended to be exhaustive or limited to the disclosure in the form disclosed. Many modifications and variations will be apparent to those of ordinary skill in the art. Further, different exemplary embodiments may provide different advantages as compared to other exemplary embodiments. The embodiment or embodiments selected are chosen and described in order to best explain the principles of the disclosure, the practical application, and to enable others of ordinary skill in the art to understand the disclosure for various embodiments with various modifications as are suited to the particular use contemplated.

What is claimed is:

1. A wireless communication method having automatic self-configuration mechanism, comprising:
    configuring a first transceiver to perform a wireless network scan process to obtain a channel status report by executing a wireless network scan program, wherein the channel status report includes channel loadings of a plurality of channels;
    configuring the first transceiver to select one of the plurality of channels with the channel loading lower than a channel loading threshold;
    configuring the first transceiver to send a sounding signal to a second transceiver through the selected one of the plurality of channels;
    configuring the second transceiver to receive the sounding signal;
    configuring the second transceiver to obtain channel status information (CSI) associated to the selected channel from the sounding signal; and
    configuring the second transceiver to determine whether a total data amount of the CSI is larger than a data amount threshold.

2. The wireless communication method according to claim 1, wherein the channel status report further includes a number of basic service set (BSS) of the plurality of channels, and the wireless communication method further includes:
    configuring the first transceiver to determine which of the plurality of channel having the number of BSS lower than a BSS threshold by analyzing the channel status report; and
    configuring the first transceiver to further select one of the plurality of channels with the number of BSS lower than the BSS threshold.

3. The wireless communication method according to claim 2, wherein the channel status report further includes received signal strength indications (RSSIs) and noise floors of the plurality of channels, and the method further comprises:
    configuring the first transceiver to select one of the plurality of channels with the RSSIs higher than a RSSI threshold and the noise floors lower than a noise floor threshold.

4. The wireless communication method according to claim 1, further including:
    configuring the first transceiver to perform a wireless network interference checking process to obtain a channel interference status report by executing the wireless network scan program;
    configuring the first transceiver to determine which of the plurality of channel having an interference lower than an interference threshold by analyzing the channel interference status report; and
    configuring the first transceiver to further select one of the plurality of channels with the interference lower than the interference threshold.

5. The wireless communication method according to claim 1, wherein the CSI further includes data rate of received packets associated with the selected one of the plurality channels, and the second transceiver is configured to determine whether the data rate is higher than a data rate threshold by analyzing the CSI,
    wherein if the data rate is determined to be lower than the data rate threshold, the first transceiver is configured to select another one of the plurality of channels with the channel loading lower than the channel loading threshold to send another sounding signal.

6. The wireless communication method according to claim 1, wherein the CSI further includes a number of receiving antenna, a number of transmitting antenna and a number of subcarriers of received packets associated with the selected one of the plurality channels, and the CSI is a product of the number of receiving antenna, the number of transmitting antenna and the number of subcarriers.

7. The wireless communication method according to claim 1, wherein the CSI is obtained by combining a plurality of sub CSI data, and the plurality of sub CSI data are obtained by configuring the second transceiver to receive the sounding signal.

8. The wireless communication method according to claim 7, wherein a total data amount represents a number of the plurality of sub CSI data, and if the total data amount of the CSI is smaller than the data amount threshold, the first transceiver is configured to perform another wireless network scan process to obtain another channel status by executing the wireless network scan program; and
    wherein if the total data amount of the CSI is larger than the data amount threshold, the first transceiver and the second transceiver are configured to perform a function based on the CSI.

9. The wireless communication method according to claim, 8 wherein the function is a TR transmission phase, the TR transmission phase including:
    configuring the first transceiver to send a TR probe signal;
    configuring the second transceiver to receive the TR probe signal;
    configuring the second transceiver to perform a time-reversal (TR) process on the TR probe signal;
    configuring the second transceiver to obtain a TR channel state information (CSI) in response to the TR probe signal.

10. A wireless communication system having automatic self-configuration mechanism, comprising:
    a first transceiver configured to perform a wireless network scan process to obtain a channel status by executing a wireless network scan program, and the channel status includes channel loadings of a plurality of channels; and
    a second transceiver wirelessly communicated with the first transceiver, wherein the first transceiver is configured to select one of the plurality of channels with the channel loading lower than a channel loading threshold;

wherein the first transceiver is configured to send a sounding signal to a second transceiver through the selected one of the plurality of channels;

wherein the second transceiver is configured to receive the sounding signal;

wherein the second transceiver is configured to obtain channel status information (CSI) from the sounding signal, and wherein the second transceiver is configured to determine whether a total data amount of the CSI is larger than a data amount threshold.

11. The wireless communication system according to claim 10, wherein the channel status further includes a number of BSS of the plurality of channels;

wherein the first transceiver is configured to determine which of the plurality of channel having the number of BSS lower than a BSS threshold by analyzing the channel status; and wherein the first transceiver is configured to further select one of the plurality of channels with the number of BSS lower than the BSS threshold.

12. The wireless communication system according to claim 11, wherein the channel status further includes received signal strength indications (RSSIs) and noise floors of the plurality of channels, and the first transceiver is configured to select one of the plurality of channels with the RSSIs higher than a RSSI threshold and the noise floors lower than a noise floor threshold.

13. The wireless communication system according to claim 10, wherein the first transceiver is further configured to perform a wireless network interference checking process to obtain a channel interference status by executing the wireless network scan program;

wherein the first transceiver is configured to determine which of the plurality of channel having an interference lower than an interference threshold by analyzing the channel interference status; and wherein the first transceiver is configured to further select one of the plurality of channels with the interference lower than the interference threshold.

14. The wireless communication system according to claim 10, wherein the CSI further includes data rate of received packets associated with the selected one of the plurality channels;

wherein the second transceiver is further configured to determine whether the data rate is higher than a data rate threshold by analyzing the CSI; and wherein if the data rate is determined to be lower than the data rate threshold, the first transceiver is configured to select another one of the plurality of channels with the channel loadings lower than the channel loading threshold to send another sounding signal.

15. The wireless communication system according to claim 10, wherein the CSI further includes a number of receiving antenna, a number of transmitting antenna, and a number of subcarriers of received packets associated with the selected one of the plurality channels, and the CSI is a product of the number of receiving antenna, the number of transmitting antenna and the number of subcarriers.

16. The wireless communication system according to claim 10, wherein the CSI is obtained by combining a plurality of sub CSI data, and the plurality of sub CSI data are obtained by configuring the second transceiver to receive the sounding signal.

17. The wireless communication system according to claim 16, wherein a total data amount represents a number of the plurality of sub CSI data obtained, and if the total data amount is smaller than the data amount threshold, the first transceiver is configured to perform another wireless network scan process to obtain another channel status by executing the wireless network scan program; and wherein if the total data amount of the CSI is larger than the data amount threshold, the first transceiver and the second transceiver are configured to perform a function based on the CSI.

18. The wireless communication system according to claim 17, wherein the function is a TR transmission phase, in the TR transmission phase, the first transceiver is configured to send a TR probe signal, the second transceiver is configured to receive the TR probe signal, the second transceiver is configured to perform a time-reversal (TR) process on the TR probe signal, and the second transceiver is configured to obtain a TR channel state information (CSI) in response to the TR probe signal.

19. A wireless communication method having automatic self-configuration mechanism, comprising:

configuring a wireless self-organizing network (SON) central controller wirelessly communicated with a first wireless SON extender to establish a wireless network system;

configuring a second wireless SON extender to join the wireless network system by performing an automatic self-configuration process, wherein the automatic self-configuration process comprises:

configuring the wireless SON central controller to perform a wireless network scan process to obtain a channel status by executing a wireless network scan program, wherein the channel status includes channel loadings of a plurality of channels;

configuring the wireless SON central controller to select one of the plurality of channels with the channel loading lower than a channel loading threshold;

establishing a first connection between the SON central controller and the second extender through the selected one of the plurality of channels.

20. The wireless communication method having automatic self-configuration mechanism according to claim 19, further comprising:

configuring an user device to join the wireless network system by communicating with the second wireless SON extender through a first channel of the plurality of channels;

configuring the second wireless SON extender and the user device to perform the automatic self-configuration process, wherein the automatic self-configuration process further comprises:

configuring the second wireless SON extender to send a sounding signal to the user device through the first channel;

configuring the user device to receive the sounding signal;

configuring the user device to obtain CSI from the sounding signal; and configuring the user device to determine whether a decreasing variance ratio of a data rate is greater than a variance ratio threshold by analyzing the CSI, wherein if the decreasing variance ratio of the data rate is determined to be greater than the variance ratio threshold, the SON central controller is configured to control the first wireless SON extender to perform the automatic self-configuration process between the first wireless SON extender and the user device, and to control the second wireless SON extender to perform the automatic self-configuration process between the second wireless SON extender and the user device and to respectively obtain a first channel status and a second channel status;

configuring the first wireless SON extender and the second wireless SON extender to respectively send the first channel status and the second channel status to the SON central controller;

configuring the SON central controller to select one of the plurality of channels with the channel loading lower than the channel loading threshold according to the first channel status and the second channel status to establish a second connection for the user device.

* * * * *